(12) United States Patent
Lund

(10) Patent No.: US 6,974,139 B2
(45) Date of Patent: Dec. 13, 2005

(54) DUAL SKI SKAG

(75) Inventor: Jerome Edward Lund, Middle River, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 3 days.

(21) Appl. No.: 10/369,221

(22) Filed: Feb. 18, 2003

(65) Prior Publication Data

US 2004/0160026 A1    Aug. 19, 2004

(51) Int. Cl.$^7$ .............................................. B62B 17/02
(52) U.S. Cl. ........................................ 280/28; 280/609
(58) Field of Search ........................... 280/28, 845, 182, 280/72, 22.1, 21.1, 16, 848, 609

(56) References Cited

U.S. PATENT DOCUMENTS

| | | | |
|---|---|---|---|
| 2,513,199 A | | 6/1950 | Ohlhaver |
| 3,381,972 A | | 2/1965 | Miller |
| 3,632,126 A | | 1/1972 | Shorrock |
| 3,643,978 A | | 2/1972 | Westberg |
| 3,718,341 A | | 2/1973 | Westberg |
| 3,732,939 A | * | 5/1973 | Samson ................... 280/28 |
| 3,773,343 A | | 11/1973 | Ambrose |
| 3,778,074 A | * | 12/1973 | Kozlow ................... 280/28 |
| 3,817,544 A | | 6/1974 | Labelle |
| 3,857,578 A | * | 12/1974 | Alton ...................... 280/26 |
| 3,866,933 A | | 2/1975 | Mollring |
| 3,870,331 A | | 3/1975 | Cryderman |
| 3,877,713 A | | 4/1975 | Mabie et al. |
| 3,942,812 A | * | 3/1976 | Kozlow ................... 280/28 |
| 4,077,639 A | | 3/1978 | Reedy |
| 4,083,577 A | | 4/1978 | Ford |
| D256,224 S | | 8/1980 | Fritz |
| 5,040,818 A | | 8/1991 | Metheny |
| 5,145,201 A | | 9/1992 | Metheny |
| 5,165,709 A | | 11/1992 | Jacques |
| 5,222,749 A | * | 6/1993 | Bergstrom ................ 280/28 |
| 5,344,168 A | * | 9/1994 | Olson et al. .............. 280/28 |
| 5,599,030 A | | 2/1997 | Campbell et al. |
| 5,700,020 A | * | 12/1997 | Noble ..................... 280/28 |
| 6,105,979 A | | 8/2000 | Desrochers |
| 6,267,392 B1 | * | 7/2001 | Noble ..................... 280/28 |
| 6,276,669 B1 | * | 8/2001 | Simmons et al. .......... 280/28 |
| 6,276,699 B1 | | 8/2001 | Simmons et al. |
| 6,378,889 B1 | * | 4/2002 | Moriyama et al. ........ 280/609 |
| 6,626,444 B2 | * | 9/2003 | Noble ..................... 280/28 |
| 6,631,912 B2 | * | 10/2003 | Metheny .................. 280/28 |
| 2001/0022435 A1 | | 9/2001 | Cormican |

(Continued)

Primary Examiner—J. Allen Shriver
(74) Attorney, Agent, or Firm—Black Lowe & Graham; Darren J. Jones

(57) ABSTRACT

A skag for a ski, such as a vehicle ski. The skag includes a carrier platform to be attached to the bottom surface of a ski. First and second longitudinal rails are disposed on the lower surface of the carrier platform. The longitudinal rails are spaced apart laterally from one another. First and second longitudinal keels are disposed on the first and second rails, respectively. At least a portion of the first rail may extend beyond the first lateral edge of the carrier platform, and at least a portion of the second rail may extend beyond the second lateral edge of the carrier platform. The back ends of the rails may be shaped so as to be flush against the carrier platform, or to have some other shape that at least partially fills in the grooves left by the keels. The skag may be made to have a unitary structure, as by welding the components thereof together to form a single piece.

25 Claims, 7 Drawing Sheets

U.S. PATENT DOCUMENTS

2002/0041080 A1    4/2002  Moriyama et al.
2002/0074752 A1 *  6/2002  Noble ........................ 280/28
2003/0030238 A1 *  2/2003  Metheny ..................... 280/28
2003/0034619 A1 *  2/2003  Bergstrom .................. 280/28
2003/0234500 A1 * 12/2003  Roberts et al. .............. 280/28
2004/0061296 A1 *  4/2004  Metheny ..................... 280/28

* cited by examiner

DUAL SKI SKAG

BACKGROUND OF THE INVENTION

1. Field of the Invention

The invention relates to a skag for a ski. More particularly, the invention relates to a skag that includes dual parallel rails and/or dual parallel keels, so as to provide improved maneuverability.

2. Description of Related Art

Skis and their use on vehicles are well known. FIG. 1 shows a conventional vehicle 1 (a snowmobile) with a ski 2 thereon. Conventional skis consist of a strip of material that is usually smooth or nearly smooth along its bottom surface. Conventional skis are used to support vehicles or persons on snow, ice, and similar terrain.

It is often desirable to make skis of materials that are relatively light, i.e. to reduce the weight of a vehicle, and/or flexible, i.e. to enable the ski to temporarily flex or deform instead of breaking when it is subjected to stress.

However, the terrain in which skis conventionally are used is often rough, and may subject the skis to considerable wear. Furthermore, even relatively smooth layers of snow, ice, etc. can be highly abrasive under certain conditions. Skis made from many materials that are light and/or flexible may wear out and/or break after a relatively short time.

To address this problem, a more durable material may be attached to the lower surface of the skis. Sometimes referred to as "rails" or "wear strips", they are adapted to resist wear, thereby increasing the usable life of the ski. In some cases, rather than being disposed directly on the ski, the rails may be disposed on a carrier platform, such as a strip or bar of metal that conforms to and is connected to the bottom surface of the ski.

As a further matter, skis without rails or some similar structure have limited ability to "grip" or "bite" snow or ice. This is of special concern when maneuvering the vehicle to which the ski is connected, i.e. when turning. Greater maneuverability may be desirable, especially at high speeds.

The previously described rails or wear strips may provide additional maneuverability beyond that possible with an otherwise smooth ski, in addition to increasing durability. By projecting downward into and/or against the snow or ice, the rails provide increased grip, and therefore improved maneuverability.

In addition, it is possible to shape the rail or a portion thereof so as to form a longitudinal keel shape, such as a wedge or a blade. Alternatively, a keel can be formed separately and mounted to a ski, without necessarily including a rail. The keel functions in a manner similar to the rail with regard to maneuverability, i.e. it cuts into the snow, ice, or other terrain on which the ski rests, providing improved bite or grip that enhances the performance, stability, and maneuverability of the ski.

In common use, the term "skag" sometimes is used to describe such a keel, and sometimes is used to describe a full assembly with such a keel that is attached to a ski. As used herein, the term "skag" is used with the latter definition, that is, a skag is a structure disposed on the lower side of a ski, which includes rails and/or a keel as described above.

A skag typically is attached to the bottom surface 3 of a conventional ski, as shown in FIG. 1.

Conventional skags have several limitations.

First, because it cuts into the underlying surface, the keel of a conventional skag often leaves behind a trail or groove. If a second vehicle with a conventional skag later follows the same path, the skag on that second vehicle may follow the track from the first vehicle, thereby aligning the second vehicle's ski with the path followed by the first vehicle. Later vehicles also may follow the track, making it deeper and more pronounced.

As a result, the second and later vehicles tend to follow closely the path of the first vehicle, and resist efforts to steer out of that path. In addition, the second and later vehicles tend to shift, sometimes abruptly, to align themselves with the path of the first vehicle if that path is crossed. These phenomena are sometimes collectively referred to as "groove follow". The former also may be referred to as "tracking", while the latter may be referred to as "darting". Both phenomena may affect the maneuverability of the second and later vehicles.

Although it is possible to overcome darting and tracking by deliberately steering a vehicle out of the path of preceding vehicles, or by avoiding such earlier paths altogether, such solutions may not always be desirable.

For example, snowmobiles, which have used skis with conventional skags, are often used on dedicated snowmobile trails. Trails are not always sufficiently spacious to make it possible for vehicle operators to avoid the grooves left by previous vehicles. This is especially true in popular trails, and in areas of heavy traffic on a trail.

Furthermore, even if it is possible to make a special effort to avoid grooves from previous vehicles, it may be difficult or undesirable to do so.

Attempts to overcome this problem have been made. For example, in U.S. Pat. No. 5,344,168 to Olson et al., a generally flat bar is employed to disrupt existing skag grooves in an effort to avoid tracking and darting. However, the addition of this bar increases the drag on the ski, since in order for the bar to function it must dig into and break up the snow or ice in order to fill in the groove. Furthermore, the bar may not be effective in disrupting grooves in hard packed snow, or in wet snow that has frozen into ice.

Another feature of conventional skags that might be improved is the ability to maneuver. Although conventional skags provide increased maneuverability over skis lacking such structures, still greater maneuverability may be desired, especially at high speeds.

The ability to maneuver with a ski with a skag thereon depends in part upon the size of the skag's rail and/or keel. As the skag is made longer, it provides greater grip or "bite" into the underlying surface, thereby allowing more force to be applied when turning.

In addition, increasing the length of a skag reduces the total weight per unit length that must be borne thereby, assuming vehicle weight is not also increased when the skag is lengthened. This may contribute to reduced wear on the skag.

However, a long longitudinal skag also has disadvantages. For example, although the skag provides maneuverability, the skag itself must be made to turn against the snow or ice surrounding it on both sides. Thus, as the skag is lengthened, more force is required to turn it.

In addition, a ski on a vehicle that is turning typically follows a curved path. As the length of a conventional straight skag increases, the ends of the skag deviate by a greater distance from that curved path. A long straight skag following a curved path may cause the vehicle to turn roughly, or in "stutters".

In addition, turning a ski with a skag thereon puts stress on the skag. As the skag length increases, the stress increases. At some point this can contribute to greater wear, and/or damage to the skag as a whole, its component parts, and/or the ski to which it is attached. For example, the increased stresses experienced by long skags may cause the skag to eventually become worn to the point that it must be replaced. The increased stresses for a long ski skag may also result in the failure of the ski skag, i.e. by the keel separating from the rail, by the rail separating from the carrier platform, by the skag or some portion thereof bending into an S-curve or otherwise deforming, etc. Because stress increases with increasing skag length, a longer ski skag is proportionally weaker than a shorter one, assuming they are made from similar materials using similar methods of construction.

Thus, although it is in some respects desirable to increase the total length of the skag, other factors limit the utility and durability of long conventional skag. For this reason, increasing the length of a conventional skag beyond a certain point does not provide further improvements in maneuverability for a vehicle equipped with a conventional skag.

SUMMARY OF THE INVENTION

It is the purpose of the claimed invention to overcome these difficulties, thereby providing an improved ski skag that provides high maneuverability and good durability.

An exemplary embodiment of a ski skag in accordance with the principles of the claimed invention includes a carrier platform adapted to be attached to a ski. First and second longitudinal rails are disposed on the lower surface of the carrier platform. The first and second rails are spaced apart laterally. First and second longitudinal keels may be disposed on the first and second rails, respectively.

The total length of rail for a given skag made in this fashion is the sum of the lengths of the first and second rails. Likewise, the total length of keel for a given skag made in this fashion is the sum of the lengths of the first and second keels. This provides positive effects for maneuverability similar to those that might be obtained with a single long rail and/or keel. However, because there are two rails and/or keels rather than a single long rail and/or keel, the drawbacks of a single long rail and/or keel with regard to maneuverability and durability are mitigated.

In addition, for a ski skag in accordance with the principles of the claimed invention, the durability benefits of increased total skag length—i.e., decreased weight load per unit length on the skags—may be obtained without the disadvantages of a single long skag.

A portion of the first rail may extend beyond one lateral edge of the carrier platform, and a portion of the second rail may extend beyond the other lateral edge of the carrier platform. That is, the width and/or the lateral spacing of the rails may be such that the rails extend past the edges of the carrier platform.

Typically, the center of motion of a turning ski and its skag is somewhere along the longitudinal center line of the ski and skag. Thus, for rails spaced apart from one another laterally, at least one and typically both will also be spaced some lateral distance from the ski's center of motion.

This lateral distance acts as an increased effective "lever arm" for the rail to apply force to the snow or ice under the ski. As a result, more force may be transmitted, and consequently maneuverability may be improved.

Arranging the rails so that they extend past the edges of the carrier platform allows for a relatively large lateral separation between them, without necessarily widening the carrier platform (and consequently increasing its weight).

Spacing the rails apart laterally also enables the keels mounted thereon to be spaced apart laterally, as well. Spacing apart the keels provides for advantages similar to those obtained from spacing apart the rails.

The back ends of the rails may be shaped so as to be flush with the carrier platform. Additionally or alternatively, the back ends of the rails may be shaped to at least partially fill in the grooves made by the keels.

The skag may be made as a unitary assembly. For example, the rails may be welded to the carrier platform, and the keels welded to the rails, so that the whole is effectively a single solid piece, without screws, bolts, etc. holding it together. It is noted that as used herein, the term "welding" is meant to include any joining process by which two parts can be joined by causing the parts themselves to unite. Thus, brazing, soldering, etc. also would be considered welding. Alternatively, some or all of the parts may be made from a single integral piece, i.e. cast together, machined from a single block of material, etc. Regardless of how it is formed, such a unitary assembly is strong and rigid, and is relatively easy to install and replace.

Because a skag in accordance with the principles of the claimed invention has multiple rails and/or keels, it is resistant to tracking and darting when a vehicle with such a skag is used in an area frequented by vehicles with conventional skags. In addition, even if a vehicle with skag in accordance with the principles of the claimed invention follows a vehicle that also has such a skag, unless the grooves left by the first vehicle have the proper orientation and spacing, there is little impetus for the second vehicle to track or dart. Furthermore, for embodiments of a skag in accordance with the principles of the claimed invention wherein the back ends of the rails are shaped to at least partially fill in the grooves made by the keels thereof, the grooves are less prone to cause tracking or darting in subsequent vehicles regardless of what sort of skag may be present on those subsequent vehicles.

BRIEF DESCRIPTION OF THE DRAWINGS

Like reference numbers generally indicate corresponding elements in the figures.

DETAILED DESCRIPTION OF THE PREFERRED EMBODIMENT

Figure 1:
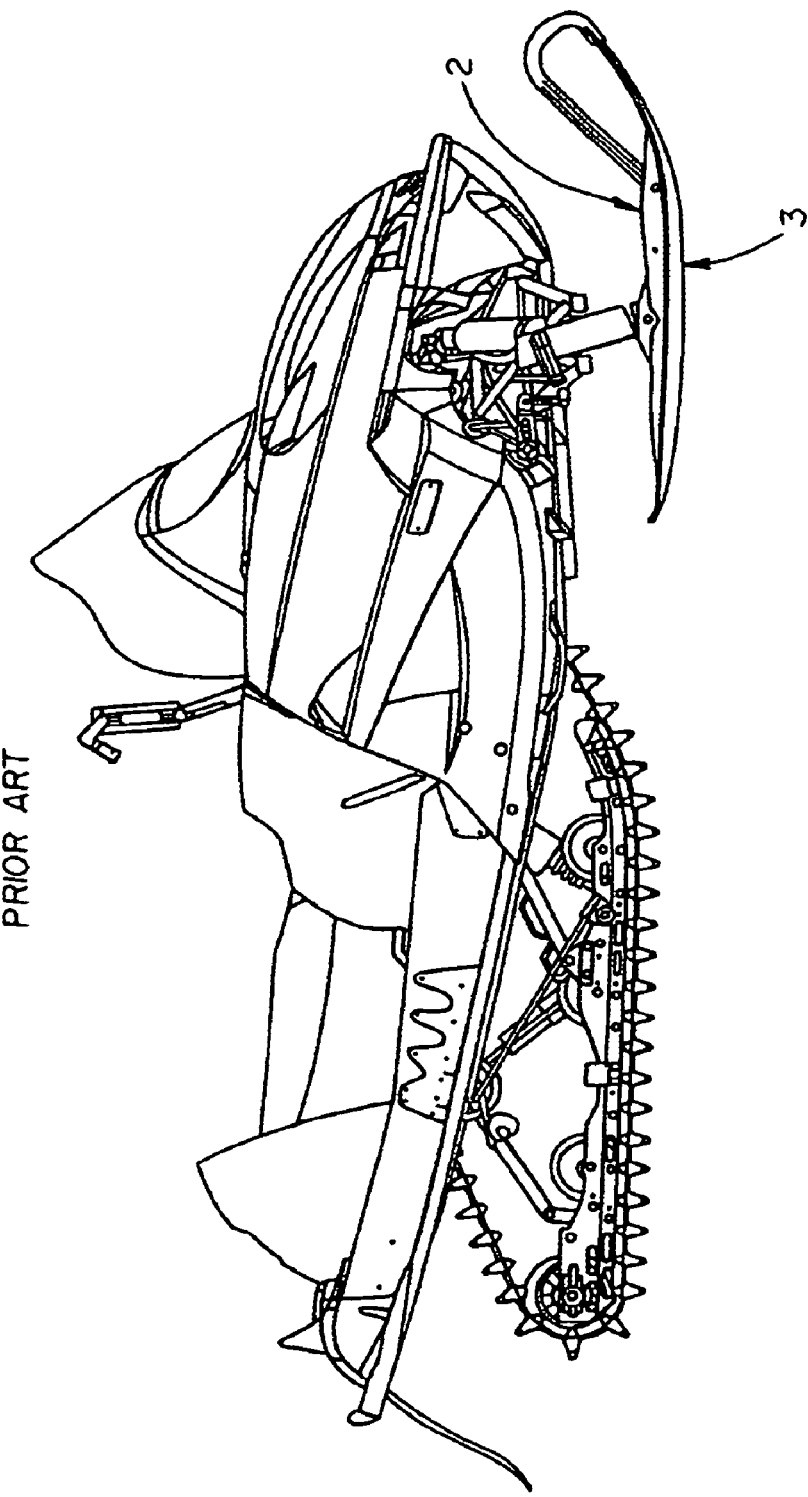
FIG. 1 is an illustration of a snowmobile with a conventional ski, as known from the prior art.
Figure 2:
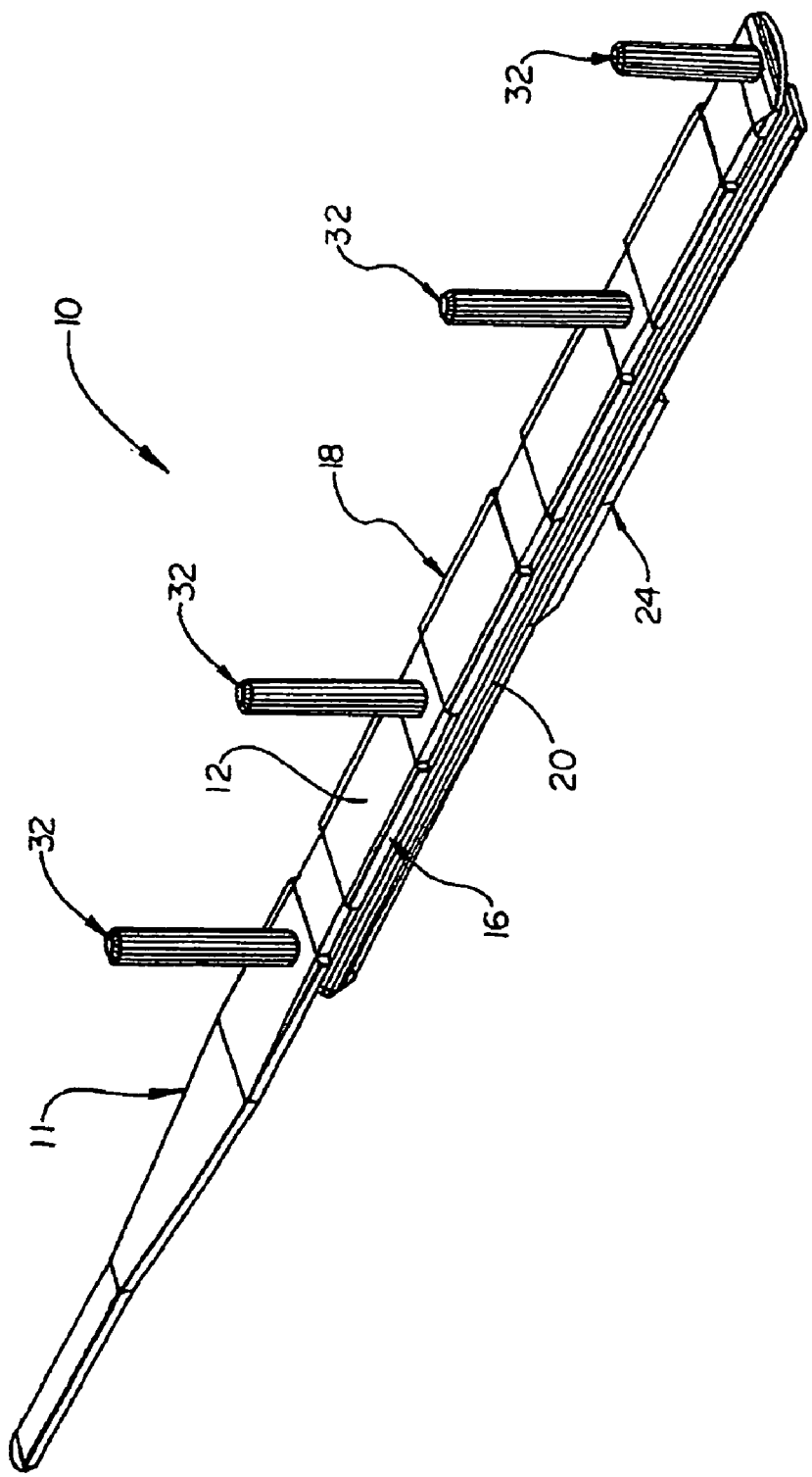
FIG. 2 is a perspective view of an exemplary embodiment of a skag in accordance with the principles of the claimed invention, showing the upper surface of the skag.
Figure 3:
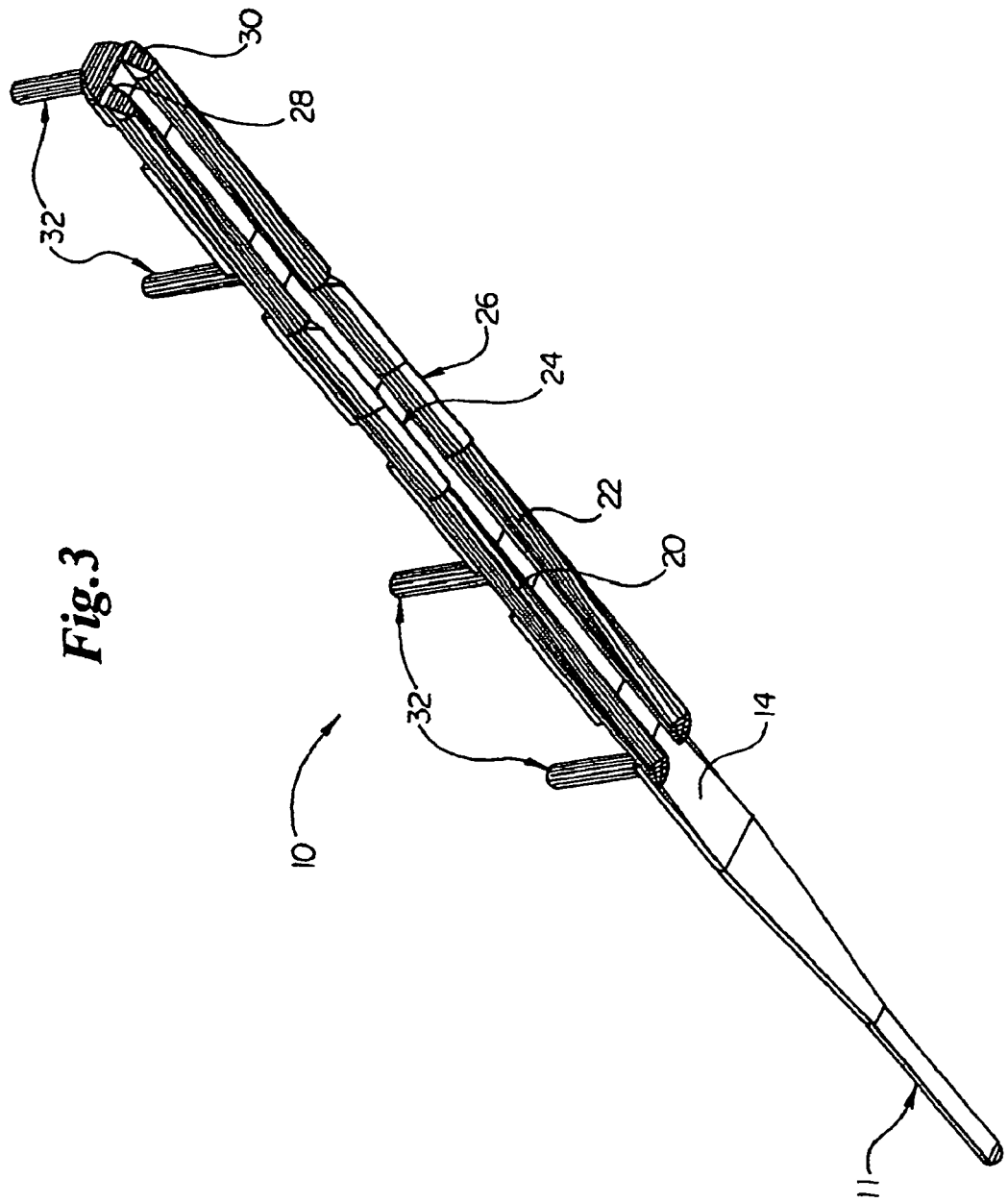
FIG. 3 is another perspective view of the skag shown in FIG. 2, showing the lower surface of the skag.

An exemplary skag 10 in accordance with the principles of the claimed invention is illustrated in perspective in FIGS. 2 and 3. Although other illustrations provide greater detail regarding the structure of the skag 10, FIGS. 2 and 3 show the overall appearance of an exemplary embodiment thereof.

Figure 4:
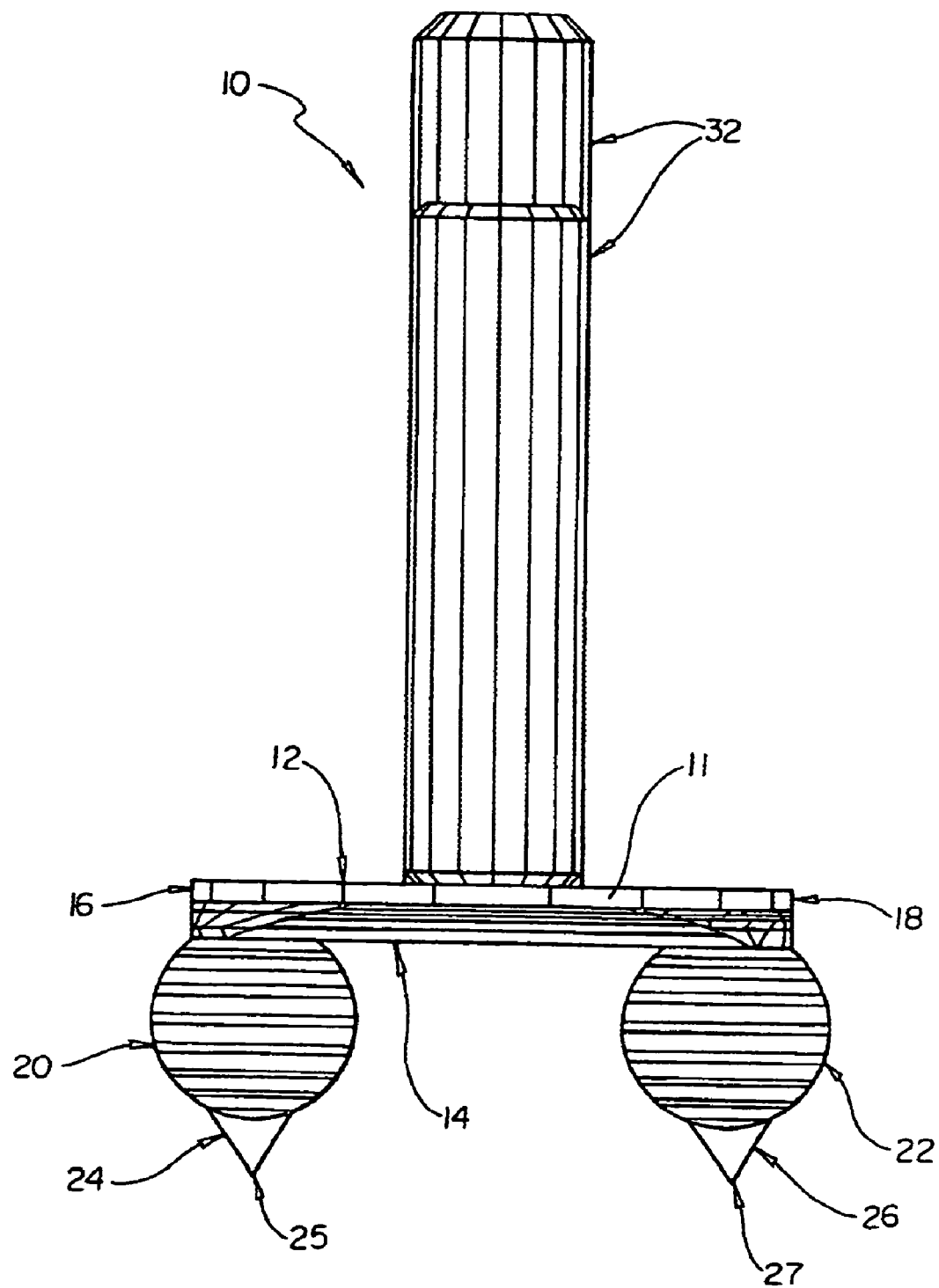
FIG. 4 is a cross section of the skag shown in FIG. 2.

Referring to FIG. 4, the skag 10 may include a carrier platform 11. The carrier platform 11 has an upper surface 12 and a lower surface 14. The upper surface 12 is adapted to be attached to a ski, typically on the underside of the ski.

The shape of the carrier platform 11 in the exemplary embodiment described herein may be easily seen from FIGS. 2 and 3. As illustrated therein, the carrier platform 11 is a flat longitudinal plate. However, this is exemplary only. A variety of shapes and configurations for the carrier platform 11 may be equally suitable. In particular, suitable shapes include but are not limited to curved shapes, so that the carrier platform 11 may conform to a curved ski.

Likewise, although the carrier platform 11 is illustrated to have a particular footprint, i.e. narrower at one end, this also is exemplary only. Other shapes and configurations for the carrier platform 11 may be equally suitable.

Returning to FIG. 4, the skag includes first and second rails 20 and 22 disposed on the lower surface 14 of the carrier platform 11, and spaced apart laterally from one another. The first and second rails 20 and 22 extend longitudinally in a direction corresponding to the length of the ski to which the skag 10 is to be attached. However, as may be seen from FIG. 3, the first and second rails 20 and 22 do not necessarily extend the entire length of the carrier platform 11.

In addition, although as illustrated the first and second rails 20 and 22 are attached to a carrier platform 11, this is exemplary only. It may be equally suitable to attach rails 20 and 22 directly to a ski, without the use of a carrier platform 11.

As illustrated in FIG. 4, the cross sections of the first and second rails 20 and 22 are in the shape of a circular segment. In the embodiment shown, the circular segment is nearly a complete circle, so that the first and second rails 20 and 22 are essentially round rods with a flat area by which they are affixed to the carrier platform 11.

A cross section in the shape of a circular segment may present relatively little drag when moved on and through materials over which the vehicle passes, such as snow and ice. Such a cross section also may be relatively unlikely to catch on surfaces or debris. In addition, a cross section free of sharp corners or other easily worn structures, such as one in the shape of a circular segment may be less prone to wear.

However, such a shape is exemplary only, and shapes other than those shown may be equally suitable. In particular, first and second rails 20 and 22 with cross sections in the shape of smaller circular segments, such as a half circle, may be equally suitable. Furthermore, first and second rails 20 and 22 with cross sections having shapes that are not circular segments may be equally suitable.

The carrier platform 11 and the first and second rails 20 and 22 may be constructed of a material different than the ski to which they are to be attached. In particular, the carrier platform 11 and the first and second rails 20 and 22 may be constructed of a harder or more durable material.

For example, in a preferred embodiment the carrier platform 11 and the first and second rails 20 and 22 are constructed of metal. In a more preferred embodiment the carrier platform 11 and the first and second rails 20 and 22 are constructed of steel and/or aluminum.

However, this is exemplary only. A variety of other materials may be suitable for the carrier platform 11 and the first and second rails 20 and 22. In addition, it is not necessary that the carrier platform 11 and the first and second rails 20 and 22 be constructed of the same material. Furthermore, in certain embodiments it may be advantageous for the carrier platform 11 and the first and second rails 20 and 22 to be constructed of the same material as the skis. In particular, it is noted that vehicle skis may be made of steel, and that this does not preclude the use of steel in the carrier platform 11 or the first and second rails 20 and 22.

In an exemplary embodiment, a first keel 24 is disposed on the first rail 20. Likewise, a second keel 26 is disposed on the second rail 22. The first and second keels 24 and 26 extend longitudinally along the first and second rails 20 and 22. This may be seen, for example, in FIG. 3. However, as also may be see from FIG. 3, the first and second keels 24 and 26 do not necessarily run the entire length of the first and second rails 20 and 22.

In addition, it is emphasized that the presence of two keels 24 and 26 in a skag 10 in accordance with the principles of the claimed invention does not imply that the total keel length for that skag 10 is twice the keel length of any particular conventional skag. The total length of the keels 24 and 26 may vary considerably, and may be more than, similar to, or less than the total keel length in conventional skags. Likewise, the individual length of each keel 24 and 26 may be more than, similar to, or less than the length of the individual keels in conventional skags.

Figure 7:
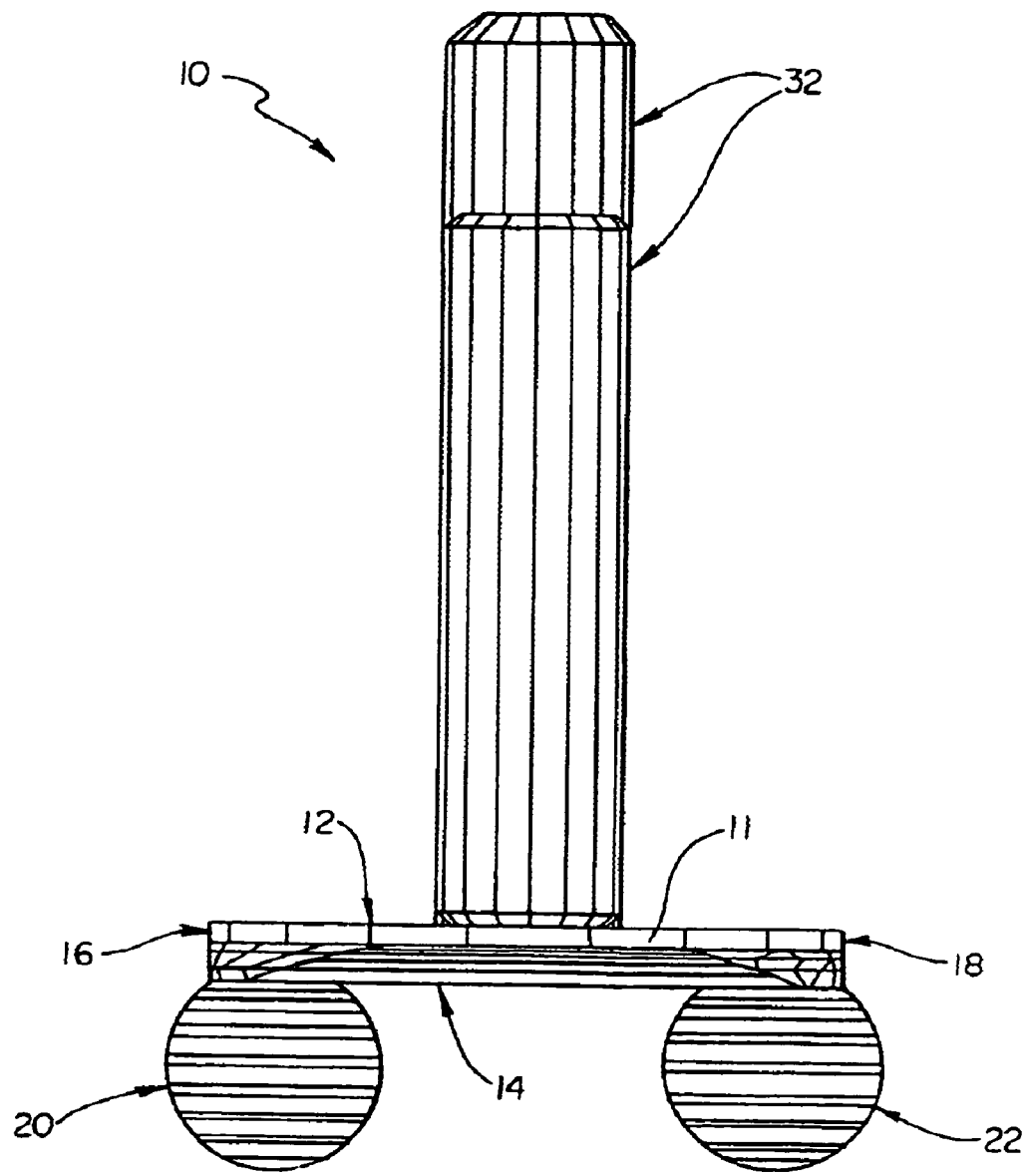
FIG. 7 is a cross section of another exemplary embodiment of a skag in accordance with the principles of the claimed invention.

Furthermore, as shown in FIG. 7, for certain embodiments it may be suitable to exclude the keels 24 and 26 altogether. As noted previously, the rails 20 and 22 may be used to enhance maneuverability.

Returning to FIG. 4, the first and second keels 24 and 26 project downwards from the rails 20 and 22, so as to provide grip between the skag (and consequently the ski and the vehicle as a whole) and the surface over which the vehicle travels. As illustrated, the first and second keels 24 and 26 have a wedge shaped cross section, with the narrow end of the wedge shape oriented downward from the carrier platform 11. However, this is exemplary only, and other shapes for the first and second keels 24 and 26 may be equally suitable. In particular, suitable shapes for providing grip with the surface include, but not limited to, rectangular cross sections and narrow blades.

The first and second keels 24 and 26 preferably are made from a relatively hard material. This provides good grip between the first and second keels 24 and 26 and the surface over which the vehicle passes, and provides durability for the first and second keels 24 and 26 in extended use. Materials such as metal carbides, including but not limited to tungsten carbide, are well suited for use in the first and second keels 24 and 26. However, this is exemplary only, and other materials may be equally suitable for use in the first and second keels 24 and 26.

Figure 6:
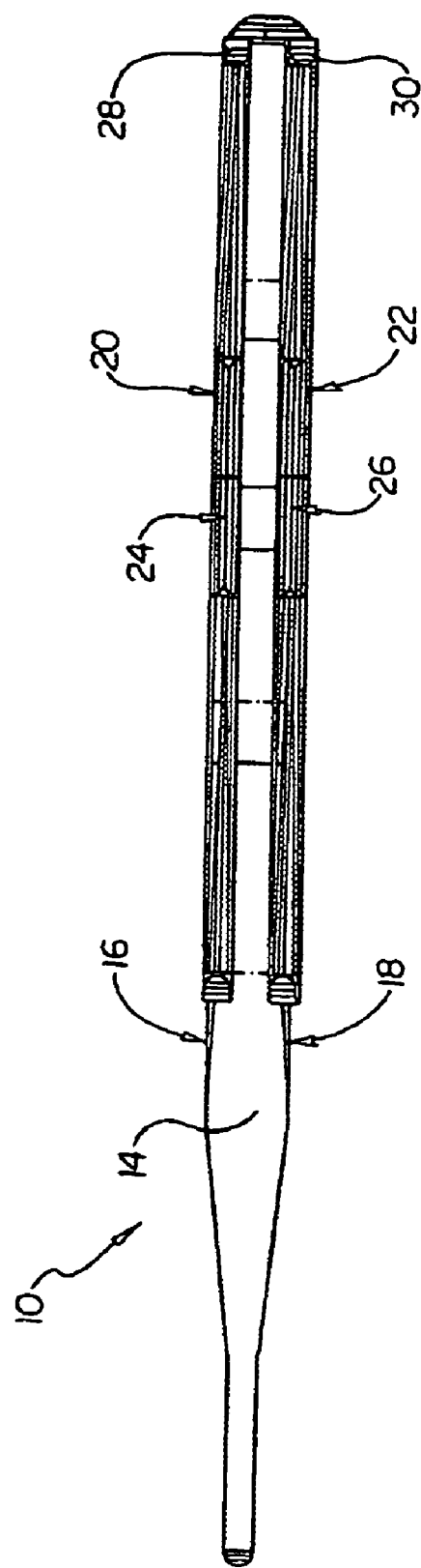
FIG. 6 is a bottom view of the skag shown in FIG. 2.

As previously described, the first and second rails 20 and 22 are spaced apart laterally from one another. In certain embodiments, the first and second rails 20 and 22 may be spaced apart laterally such that at least some portion of the first rail 20 extends laterally outward past the first lateral edge 16 of the carrier platform 11, and/or at least some portion of the second rail 22 extends laterally outward past the second lateral edge 18 of the carrier platform 11. Such an arrangement is most easily visible in FIGS. 4 and 6.

In addition, in certain embodiments the first and second rails 20 and 22 may be shaped so that the back ends 28 and 30 of the first and second rails 20 and 22 are flush with the carrier platform 11. This may be seen in FIG. 3. As illustrated therein, the back ends 28 and 30 are beveled, and intersect the flat lower side 14 of the carrier platform 11 at an angle. However, this is exemplary only, and other arrangements may be equally suitable.

With back ends 28 and 30 of the first and second rails 20 and 22 in the shape illustrated in FIG. 3, the back ends 28 and 30 tend to at least partially smooth out the grooves left behind by the keels 24 and 26. In addition, the back ends 28 and 30 as shown in FIG. 3 do not include sharp corners or other features to cause unnecessary drag, or to interfere with maneuverability. However, the shape shown in FIG. 3 is exemplary only. Back ends 28 and 30 with other shapes that at least partially smooth out the grooves left behind by the keels 24 and 26 may be equally suitable. Furthermore, back ends 28 and 30 with shapes that do not smooth out the grooves left behind by the keels 24 and 26 may be equally suitable.

The skag 10 may be formed as a unitary piece. That is, the skag 10 may be constricted such that the components thereof are connected to one another so as to form essentially a single, solid part, without the need for fixtures such as screws, bolts, etc. For example, the skag 10 may be made into a unitary structure by welding the first and second rails 20 and 22 to the carrier platform 11, and by likewise welding the first and second keels 24 and 26 to the first and second rails 20 and 22. Alternatively, the skag 10 might be cast or otherwise formed as an integral piece, so that welding or other attachment steps are not required. Skags 10 having a unitary structure may be relatively strong and/or rigid. In addition, skags 10 having a unitary structure may be less prone to certain types of long term wear, since there are no separate parts to become loose, rub or vibrate against one another, etc. However, the arrangements described herein for producing a skag 10 with unitary construction are exemplary only; other such arrangements may be equally suitable. In addition, skags 10 that do not have unitary construction, i.e. which are composed of two or more separate parts, also may be equally suitable.

Figure 5:
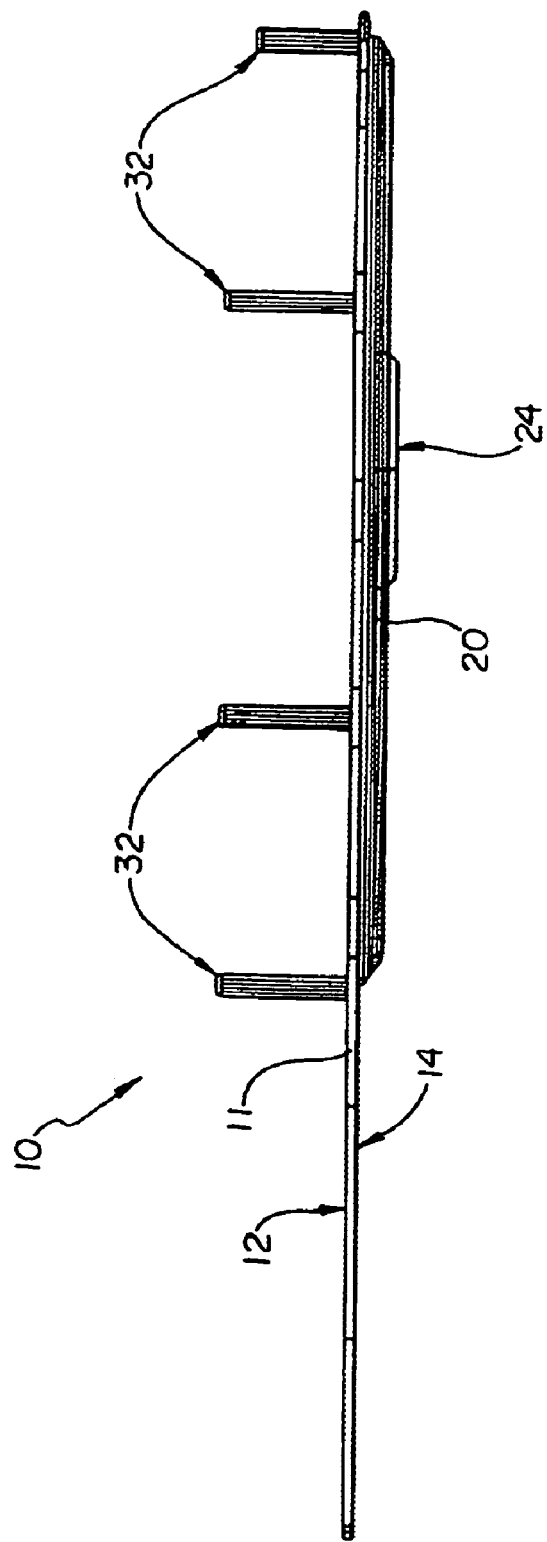
FIG. 5 is a side view of the skag shown in FIG. 2.

With regard to attaching the skag 10 to a ski, the skag 10 may include mounting rods 32. As illustrated in FIG. 5, the mounting rods 32 are connected to the carrier platform 11, and extend vertically upwards for some distance. Such mounting rods 32 may, for example, fit into matching holes in the ski. The mounting rods 32 may be held in place using a variety of means, including but not limited to fasteners. For example, in an exemplary embodiment the rods 32 may be threaded, and held in place with nuts. Alternatively, the rods 32 may be held in place with pins, screws, clamps, etc.

However, such an arrangement is exemplary only, and other means for attaching the skag 10 to a ski may be equally suitable.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A ski skag, comprising:
   a carrier platform adapted to be attached to a ski;
   first and second longitudinal rails disposed on a lower surface of said carrier platform, said first and second rails being spaced apart laterally a distance greater than a width of the first or second rail; and
   first and second longitudinal keels disposed on a lower surface of said first and second rails, respectively.

2. The ski skag according to claim 1, wherein:
   at least a portion of said first rail extends laterally beyond a first lateral edge of said carrier platform at the lower surface of the carrier platform, and at least a portion of said second rail extends laterally beyond a second lateral edge of said carrier platform at the lower surface of the carrier platform.

3. The ski skag according to claim 1, wherein:
   a back end of each of said first and second rails is shaped so as to be flush with said carrier platform.

4. The ski skag according to claim 1, wherein:
   a back end of each of said first and second rails is shaped so as to at least partially fill in a groove formed by said first and second keels, respectively in a surface over which said ski skag passes.

5. The ski skag according to claim 1, wherein:
   said keels comprise a cross section in the shape of a wedge, with a narrow end of said wedge shape oriented downward from said carrier platform.

6. The ski skag according to claim 1, wherein:
   said keels comprise a metal carbide.

7. The ski skag according to claim 1, wherein:
   said rails comprise a cross section that includes a semi-circle shape.

8. The ski skag according to claim 1, wherein:
   said skag comprises steel.

9. The ski skag according to claim 1, wherein:
   said skag comprises aluminum.

10. The ski skag according to claim 1, wherein:
    said first and second rails are connected to said carrier platform, and said first and second keels are connected to said first and second rails, respectively, in such a fashion that said ski skag comprises a unitary assembly.

11. The ski skag according to claim 10, wherein:
    said first and second rails are welded to said carrier platform, and said first and second keels are welded to said first and second rails, respectively.

12. The ski skag according to claim 10, wherein:
    said carrier platform, said first and second rails, and said keels are formed integrally from a single piece of material.

13. The ski skag according to claim 10, wherein:
    said carrier platform and said first and second rails are formed integrally from a single piece of material.

14. The ski skag according to claim 1, further comprising:
    a plurality of mounting rods disposed on an upper surface of said carrier platform.

15. A method of improving durability of a ski skag, the method comprising the steps of:
    providing said ski skag with:
      a carrier platform adapted to be attached to a ski, said carrier platform having substantially the same width as said ski;
      first and second longitudinal rails disposed on a lower surface of said carrier platform, said first and second rails being spaced apart laterally with a portion of the lower surface of the carrier platform being exposed between the first and second rails; and
      first and second longitudinal keels disposed on said first and second rails, respectively.

16. The method according to claim 15, wherein:
    at least a portion of said first rail extends beyond a first lateral edge of said carrier platform, and at least a portion of said second rail extends beyond a second lateral edge of said carrier platform.

17. The method according to claim 15, wherein:
    said keels comprise a metal carbide.

18. The method according to claim 15, wherein:
    said rails comprise a cross section in the shape of at least a segment of a circle.

19. The method according to claim 15, wherein:
    said skag comprises steel.

20. The method according to claim 15, wherein:
    said skag comprises aluminum.

21. The method according to claim 15, wherein:
said first and second rails are connected to said carrier platform, and said first and second keels are connected to said first and second rails, respectively, in such a fashion that said ski skag comprises a unitary assembly.

22. The ski skag according to claim 21, wherein:
said first and second rails are welded to said carrier platform, and said first and second keels are welded to said first and second rails, respectively.

23. The ski skag according to claim 21, wherein:
said carrier platform, said first and second rails, and said keels are formed integrally from a single piece of material.

24. The ski skag according to claim 21, wherein:
said carrier platform and said first and second rails are formed integrally from a single piece of material.

25. A snowmobile, comprising:

first and second skis;

a carrier platform attached to a lower surface of each of said skis;

first and second longitudinal rails disposed on a lower surface of each of said carrier platforms so as to be disposed on a lower surface of each ski, said first and second rails being spaced apart laterally a distance greater that a width of one of the first or second rail; and first and second longitudinal keels disposed on said first and second rails, respectively, of each of said first and second carrier platforms.

* * * * *